June 16, 1931. J. H. CHEETHAM 1,810,202
PACKLESS VALVE
Original Filed Sept. 21, 1925
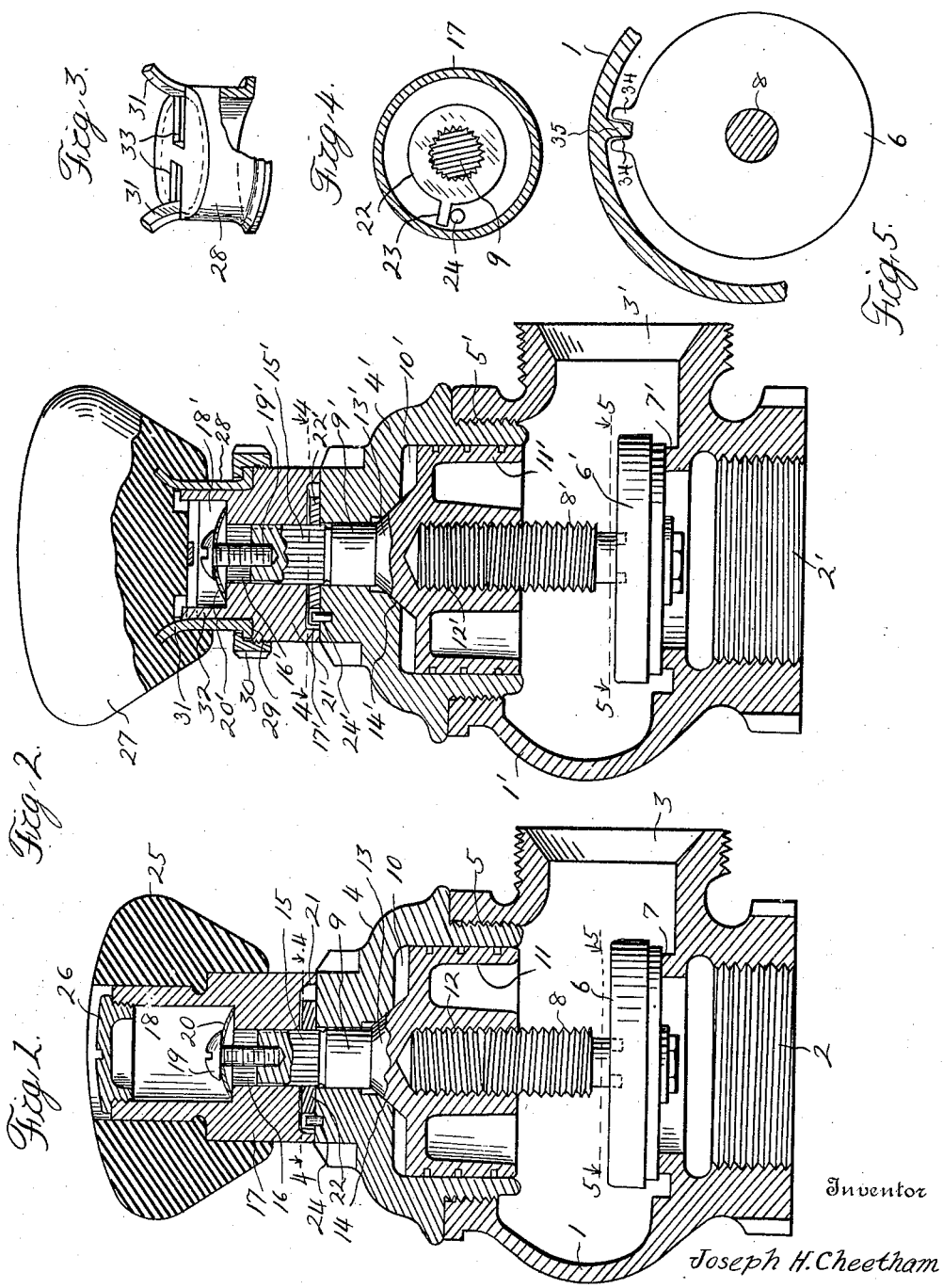
Inventor
Joseph H. Cheetham
By J. S. Murray
Attorney Patented June 16, 1931

1,810,202

UNITED STATES PATENT OFFICE

JOSEPH H. CHEETHAM, OF DETROIT, MICHIGAN

PACKLESS VALVE

Application filed September 21, 1925, Serial No. 57,584. Renewed November 19, 1930.

This invention relates to valves and particularly relates to valves requiring no packing around the stem.

In valves of the packless type, there is usually a shoulder or its equivalent upon the stem to seat endwise of the stem upon the casing of the valve and thus form a seal preventing leakage around the stem. To hold such shoulder or the like to its seat under the necessary sealing pressure, it is common to employ a spring so acting upon the stem as to urge such shoulder to its seat. Such springs, however, eventually weaken or corrode and require replacement, and if rotation of the stem is productive of relative motion between such a spring and either of its abutments, there is likely to occur either a scoring of the abutment by the spring or a torsional overstressing of the spring.

It is an object of the present invention to provide a valve in which leakage past the stem will primarily be prevented by means of a collar upon the stem fitted within a suitable chamber of the valve casing and having a considerable surface in sealing engagement with a wall of said chamber.

Another object is to utilize such a collar to receive the pressure of a fluid controlled by the valve, when the latter is unseated, whereby the aforesaid pressure acts to maintain the aforesaid sealing engagement.

Still another object is to provide an improved mounting of the handle of a valve upon the stem thereof, facilitating disassembly of said parts for inspection or other purposes.

These and various other objects the invention attains by the construction hereinafter described and illustrated in the accompanying drawings, wherein:

Fig. 1 is a view in vertical sectional elevation of one form of the improved valve.

Fig. 2 is a similar view of another embodiment of the invention.

Fig. 3 is a perspective detail view of a collar which, in the construction shown in Fig. 2, serves as one of the elements for operatively connecting the valve handle to the stem.

Fig. 4 is a cross sectional view, taken upon the line 4—4 of Fig. 1 or Fig. 2, and showing a provision for limiting the opening movement of the valve.

Figure 5 is a view, partly in section, on line 5—5 of Figs. 1 and 2 showing an engagement of the valve member with the casing, preventing rotation of the former.

In these views, the reference character 1 designates the valve casing, the inlet and outlet ports of which are indicated at 2 and 3 respectively. 4 designates a bonnet member the lower end portion of which is screw-threaded into the casing 1, as indicated at 5.

The inlet port 2 is controlled by a disk valve 6 engageable with a raised annular seat 7, marginal to said port. A screw-threaded stem member 8 rises centrally and preferably integrally from said valve. An aligned stem member 9 is journaled centrally in the bonnet member and the latter has in its lower portion a cylindrical chamber 10 wherein is fitted a collar 11 carried by the lower end of the member 9 and preferably integral with the latter. 12 is a socket extended centrally up into the collar 11 and receiving the upper portion of the member 8, and having screw-threaded engagement with said member. Just above the collar 11, the stem 9 is enlarged to form a conical shoulder 13 which engages a correspondingly shaped annular seat 14 provided by the bonnet member 4.

The stem 9 has a splined end portion 15 projecting above the bonnet member and engaging a correspondingly splined socket 16 centrally formed in a driving member 17 which seats upon said bonnet member. The driving member 17 has a chamber 18 opening in its upper end, and a screw 19 engaging said stem is headed within said chamber, and a bow spring 20 is compressed between the head of said screw and the bottom of said chamber. Thus said screw and spring jointly retain said driving member in engagement with the stem 9, and said spring further exerts an upward stress upon the stem, tending to hold the shoulder 13 in proper sealing engagement with its seat.

In the lower end face of the member 17, a shallow chamber 21 opens, and within said chamber is disposed a collar 22 splined upon the stem and formed with one or more radially projecting lugs 23 which by engagement with a pin 24 fast in the top of the bonnet member is adapted to adjustably limit rotation of the stem and consequently the opening movement of the valve member.

25 designates a handle which is fast upon the driving member 17. Preferably said handle has a central opening extending between its top and bottom faces, which opening receives the driving member, the external face of the latter being interlocked with the wall of said opening. A screw cap 26 engages the upper end of the driving member within said opening of the handle and forms a detachable closure for the chamber 18 of said member.

As regards the alternative construction, illustrated by Figs. 2, 3, and 4, the parts 1' to 24' thereof substantially duplicate the parts 1 to 24 of the structure already described. The driving member 17' of said alternative construction, however, does not have direct interlocking engagement with the handle 27, but rather the latter permanently carries a collar 28 which embraces the upper end portion of said driving member and which has its lower end externally flanged and seated upon a shoulder 29 of said member. A nut 30 internally flanged above the flange of said collar is threaded upon the driving member just below said shoulder and is thus adapted to clamp the collar fast upon said shoulder. Lugs 31 upstanding from the collar 28 are embedded in the handle 27, and upstanding projections 32 upon the driving member 17' engage in openings 33 of said collar to drive said member 17' from the collar.

For the purpose of holding the valve disk 6 or 6' from rotation so that it may be fed up or down due to its screw-threaded connection with the handle, said disk is marginally formed with a pair of outwardly projecting lugs 34 engaging at each side of a vertical rib 35 upon the casing.

From the foregoing it will appear that, in both forms of the invention, any leakage through the bonnet member around the stem journaled therein is very positively prevented. A double seal against such leakage is established, namely, between the shoulder 13 or 13' and its seat and between the collar 11 or 11' and the cylindrical wall of the chamber receiving said collar. It will be noted that said collar has somewhat the form of an ordinary piston, affording a large peripheral surface area for sealing engagement with the chamber wall.

In addition to itself establishing a seal, the collar 11 or 11' acts under certain conditions to assist in maintaining a tight seal between the coned shoulder 13 or 13' and its seat. Thus when the valve member 6 or 6' is unseated, such fluid pressure as may thus arise within the casing 1 acts upwardly against the collar 11 or 11' and supplements the leaf spring 20 in urging the shoulder 13 or 13' to its seat.

That form of driving connection shown in Fig. 1 between the handle 25 and the stem 9 is highly simplified and is consequently inexpensive and readily assembled.

The alternative connection, which Fig. 2 illustrates, also effects an advance in the direction of simplicity as compared to present practices, and further presents the advantage that the nut 30 whereby the handle is attached to the driving member is so connected to the former that it may not readily be lost.

What I claim is:

1. In a valve, a casing, a valve member adapted to seat within said casing, an actuating stem for said valve having an end portion projecting from said casing, a handle for actuating said stem, having a central opening between its top and bottom faces, a member carrying the handle entering said opening, and rigidly connected to the handle, said member having a driving engagement with said projecting portion of the stem and being slidable upon said portion, and said member being formed with a chamber opening in its outer end, means within said chamber securing said member upon the stem, and a closure for the chamber of said member carried by said member within said central opening of the handle and removable independently of any loosening of said handle on said member and removable independently of the handle securing means.

2. In a valve, a casing, a valve member adapted to seat within said casing, an actuating stem for said valve member having an end portion projecting from the casing, a handle, a member carrying said handle, seated at one end upon the casing and having said end formed with a chamber through which the stem extends, said member having a driving connection with the stem, and means within said chamber for limiting rotation of the stem.

In testimony whereof I sign this specification.

JOSEPH H. CHEETHAM.